United States Patent Office 2,828,167
Patented Mar. 25, 1958

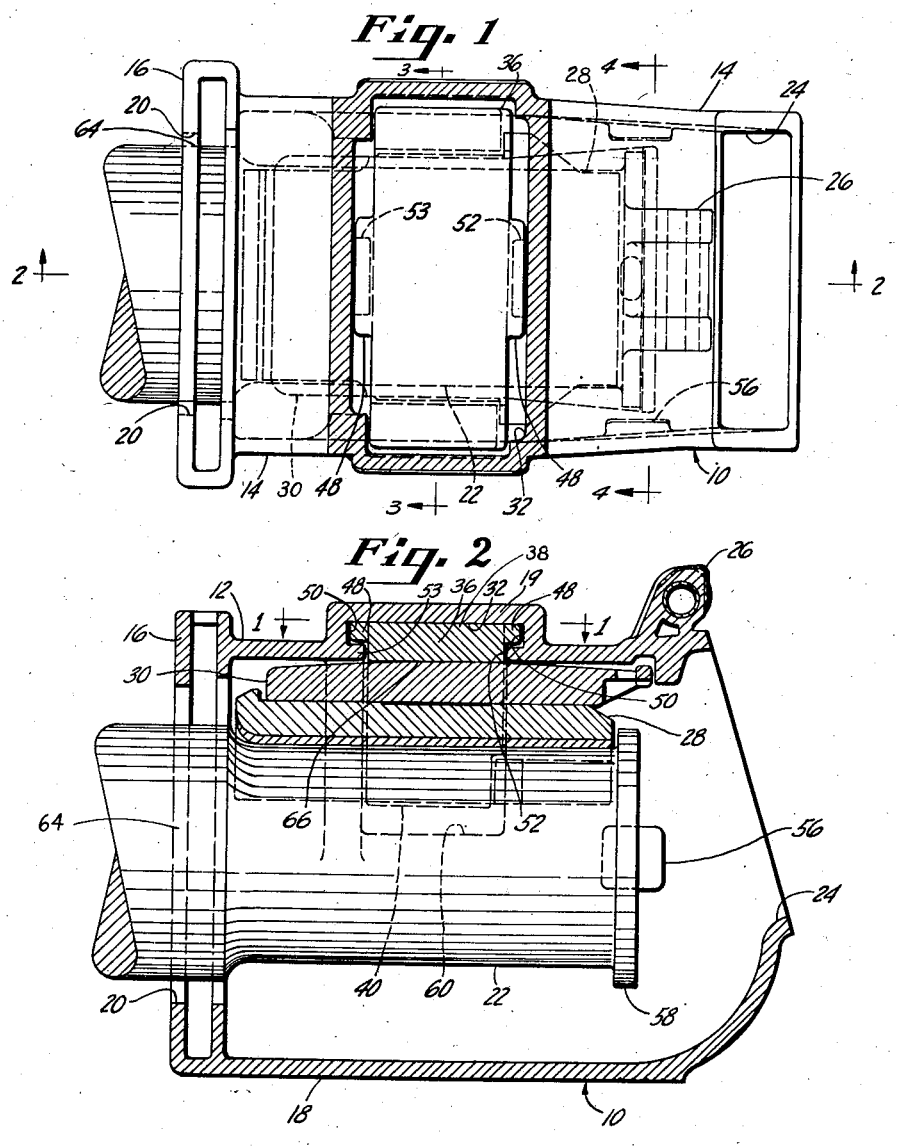

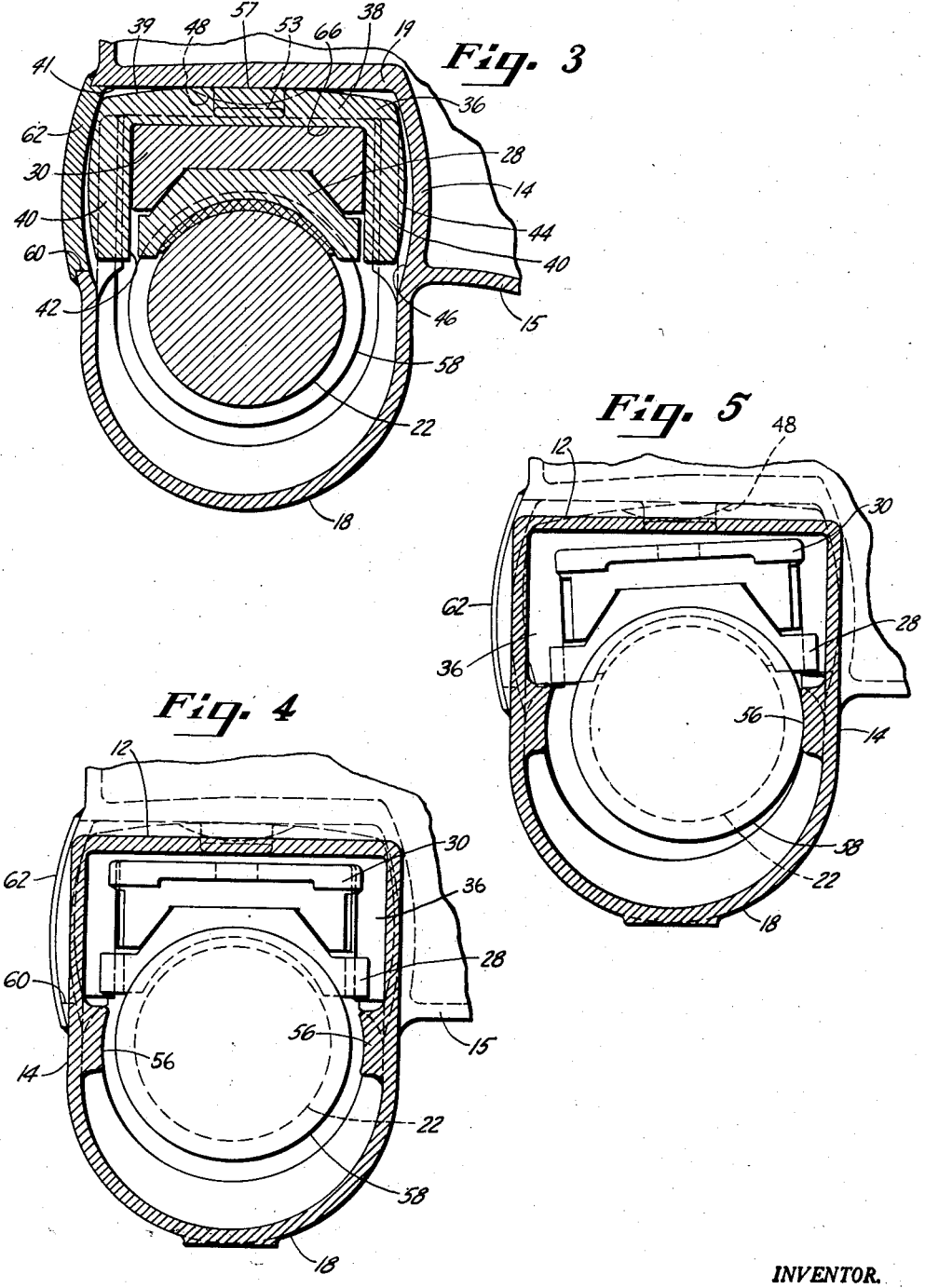

2,828,167

RAILWAY JOURNAL BOX

Wallace E. Baillie, Cleveland Heights, Ohio, assignor to National Malleable and Steel Castings Company, Cleveland, Ohio, a corporation of Ohio Application November 2, 1955, Serial No. 544,445

9 Claims. (Cl. 308—55)

This invention relates to a railway journal box and more specifically to means for eliminating objectionable unseating of the bearing from the journal therein.

One of the major problems in railway car maintenance has been the frequent occurrence of overheated journal boxes, or what is more commonly referred to as hot boxes. The causes of hot boxes are several; however, improper or inadequate lubrication of the journal bearing is involved in most cases. One of the more prevalent causes of inadequate lubrication is the accumulation of waste between the journal and the bearing such that the lubricant is partially or completely prevented from entering therebetween. This condition is likely to occur whenever a railway car is subjected to a sudden longitudinal impact or jolt which may raise the bearing off the journal for a short interval of time due to the wedging action of the journal against the bearing. During this interval, lint or short strands of waste from the journal box may enter the space momentarily created between the journal and the bearing. When the bearing becomes reseated on the journal, the displaced strands become trapped therebetween and block the supply of oil to the bearing, thereby substantially reducing further lubrication of the bearing. Localized high friction or hot spots result and eventually a general bearing overheating occurs. If such an overheating is allowed to progress undetected, the temperature will rise until the bearing will be destroyed and cause a journal burn-off or fracture leading to a possible derailment.

Previous journal box constructions, in addition to being susceptible to the aforementioned hot box problem, are also susceptible to spread bearing linings, which usually are caused by an uneven loading on the bearing each time the car is subjected to a longitudinal impact. More specifically, on a longitudinal impact, as the bearing becomes partially unseated from the journal, only that portion of the bearing that still remains in contact with the journal (namely, one of the lower inside edge portions of the bearing) transmits the longitudinal impact force to said journal, with the result that said edge portion develops a spreading of the bearing lining thereon. It will be obvious that the magnitude of the impact force and the unevenness of the loading on the bearing, due to the high impact force, would be materially lessened if a portion of such impact force would by-pass the bearing and be transferred directly to the journal box.

Accordingly, it becomes necessary to provide a means whereby the bearing is prevented from becoming unseated from the journal, particularly when the car is subjected to an end shock. The present invention solves this problem through the provision of a journal box structure wherein a U-shaped rocker member causes the journal, the bearing, and the wedge to remain intact and rock as a unit on the underside of the top wall of the journal box whenever the associated car is subjected to a sudden longitudinal impact, and in addition to limit the fore-and-aft movement of the wheel-axle assembly by stop means within the journal box.

Therefore, the primary object of the invention is to provide a journal box structure which will prevent the unseating of the bearing from the journal whenever the associated car is subjected to a longitudinal impact.

Another object of the invention is to provide a journal box structure having a rocker member which will enable the journal, the bearing, and the wedge assembly to remain intact and rock as a unit on the underside of the top wall of the journal box and having stop means, so that when the car is subjected to a longitudinal impact, the horizontal force between the bearing and the journal is reduced and more evenly distributed.

A further object of the invention is to provide a novel journal box structure in accordance with the above objects, which will allow the continued use of standard waste packing, bearings, wedges and journals. In addition, the invention is easy to assemble and provides substantial savings in maintenance costs.

Other objects and advantages of the invention will be apparent from the following description taken in conjunction with the drawings in which:

Fig. 1 is a partially sectional top plan view taken along line 1—1 of Fig. 2, showing a journal box equipped with a rocker member in accordance with the invention.

Fig. 2 is a longitudinal sectional view taken along line 2—2 of Fig. 1, the journal being shown in full.

Fig. 3 is a transverse sectional view taken along line 3—3 of Fig. 1.

Fig. 4 is a transverse sectional view taken along line 4—4 of Fig. 1.

Fig. 5 is a transverse sectional view similar to Fig. 4, but showing the journal with its bearing, wedge and rocker assembly displaced from its normal position, with the axle collar engaging stop means in the journal box.

Referring to the drawings, there is shown a journal box 10 having a top wall 12, side walls 14, rear wall 16 and a transversely arcuate bottom wall 18. The box is shown as being integral with a conventional side frame, a portion of which is indicated at 15. Top wall 12 has an elevated portion 19, the purpose of which will be hereinafter explained. The usual oblong opening 20 is provided in rear wall 16 of the journal box to receive journal 22. At the forward end of the journal box, there is formed a front opening 24 defined by the aforementioned top, bottom, and side walls. Disposed forwardly on top wall 12 is lug 26 which affords the usual hinged connection for a conventional journal box lid (not shown).

Interiorly, the journal box is provided with a journal bearing member 28 which is supported on journal 22. A conventional wedge member 30 is supported on bearing 28. Interposed between the underside of elevated portion 19 and wedge 30 is rocker member 36. A transverse rectangular recess 32, as best seen in Figs. 1 and 2, is formed in elevated portion 19, the purpose of which will be hereinafter explained.

Referring to Fig. 3, rocker member 36 comprises a transverse horizontal saddle portion 38 and a pair of depending legs 40 which extend downwardly from the ends of saddle portion 38. Thus, rocker 36 comprises a substantially inverted U-shaped member which straddles bearing 28 and wedge 30 and retains these members as a unit. Top surface 39 of saddle portion 38 is generally transversely crowned and is made engageable with bottom surface 41 of elevated portion 19. Thus, rocker member 36 is adapted to rock against the underside of elevated portion 19. The inner surfaces 42 of legs 40 are disposed adjacent the sides of bearing 28 and wedge 30. The outer surfaces 44 of legs 40 are spaced from side walls 14 of the journal box and are curved convexly to correspond substantially with the concave inner surfaces 46 of side walls 14. This construction causes rocker member 36 to automatically seek a centered position relative to side walls 14 as member 36 rocks on the underside of portion 19.

Disposed on each side of saddle portion 38 (Fig. 2) and forming a continuation thereof are flange portions 48, which are adapted to fit into grooves 50 in top wall 12. Flange portions 48 are adapted to be supported on corresponding forward and rear support ledges 52 and 53 during assembly and disassembly of the journal box parts. It will thus be seen that ledges 52 and 53 are disposed on the forward and rearward walls, respectively, of recess 32 and serve as retaining ledges for rocker member 36 during assembly or diassembly as aforementioned. It will be noted that flange portions 48 (Fig. 3) are convexly curved on their underside and are spaced from ledges 52 and 53 to avoid interference with said ledges when rocker 36 rocks on the underside of elevated portion 19. It will be understood that the aforementioned flange-ledge support means represents only one of many possible means by which the rocker member may be held in position during assembly or disassembly of the journal box parts.

It is a well known fact that when longitudinal loads are applied to car frames having the conventional type journal boxes, the initial sudden impact is often great enough to cause the journal bearing to become unseated momentarily from its normal position on the journal, thereby permitting waste to enter therebetween. The present invention avoids the occurrence of such an unseating of the bearing with the journal. As aforementioned, top surface 39 (Fig. 3) of rocker member 36 is transversely crowned and is made engageable with the underside of elevated portion 19. The entire journal, bearing, wedge and rocker assembly is thus adapted to rock as a unit against the underside of elevated portion 19. Accordingly, instead of bearing 28 becoming momentarily separated from the journal, the entire assembly remains intact and is caused to rock in a substantially vertical plane until further movement relative to the journal box is restricted by the engagement of either axle collar 58 with stop 56 (Fig. 5) or axle dust guard seat 64 with the journal box at opening 20. Once the axle engages either stop 56 or the journal box at opening 20, the longitudinal impact is substantially relieved and there is no further tendency of the bearing to unseat. It will thus be seen that there is provided a positive means for preventing the unseating of the bearing from the journal whenever the associated car is subjected to a longitudinal impact. The invention also substantially eliminates the spread bearing lining problem by having the longitudinal impact transferred directly from the axle to the stop means in the journal box housing.

The contour of top surface 39 of rocker member 36 is preferably such that stability is provided to the bearing assembly and contact of the axle with stop means 56 is prevented during all train operations, except upon severe longitudinal impact. Such stability may be provided by forming surface 39 with a flat central portion, as shown at 57 in Fig. 3, and blending it into the adjacent curved portions of the surface.

To assemble the proposed structure, rocker member 36 is entered into the journal box through an opening 60 which is provided in one of walls 14 (Fig. 4). Opening 60 is then covered by a wall plate 62 and secured to the side of the journal box by any convenient means, such as welding. The assembly of rocker member 36 into the journal box is preferably done during the manufacture of the side frame. Next, the side frame is placed over journal 22. Journal bearing 28 is then inserted through opening 24 and positioned on journal 22. In a similar manner, wedge 30 is entered into the journal box and is positioned on bearing 28. The side frame is then lowered so that bottom surface 66 of rocker 36 comes to rest on the top surface of wedge 30.

Disassembly of the journal box is accomplished by performing each of the above steps in reverse order.

It will thus be seen that there is provided a positive means for preventing the unseating of the journal bearing from the journal and preventing waste from entering therebetween, thus averting one of the major causes of the so-called hot boxes. In addition, the problem of spread bearing linings is solved by directing the longitudinal impact force from the axle to the journal box stop means.

The terms and expressions which have been employed are used as terms of description and not of limitation and there is no intention, in the use of such terms and expressions, of excluding any equivalents of the features shown and described or portions thereof, but recognize that various modifications are possible within the scope of the invention claimed.

I claim:

1. In a railway car journal box having a top wall, a journal extending into said box, a bearing disposed on said journal, a wedge disposed on said bearing, and a rocker member disposed between said wedge and said top wall, said member comprising means embracing the sides of said bearing and wedge substantially throughout the full vertical extent of said sides to cause said journal, bearing and wedge to rock as a unit relative to the box when the associated car is subjected to a longitudinal impact.

2. A railway car journal box comprising a top wall including a substantially flat undersurface, a rear wall having an opening therein, a journal extending into said box through said opening, a bearing disposed on said journal, a wedge disposed on said bearing, and a U-shaped rocker member disposed between said top wall and said wedge, said member totally embracing in a vertical direction the sides of said wedge and bearing, the top surface of said member being of generally convex configuration in a transverse direction and engaging said undersurface, said member being rockable relative to said top wall to cause said journal, bearing and wedge to rock as a unit when the associated car is subjected to a longitudinal impact.

3. A railway car journal box according to claim 2 wherein said member comprises a transverse saddle portion having a depending leg at each end of said portion, the top surface of said portion in a transverse direction comprising a generally flat central section and generally convexly curved sections disposed adjacent to and extending laterally from said flat section.

4. In a railway car journal box comprising top and side walls, said top wall including a substantially flat undersurface, a journal extending into said box, a bearing on said journal, a wedge on said bearing, a rocker member on said wedge having its top side curved generally convexly in a transverse direction for rockable engagement with said undersurface, front and rear flange means on said top wall for supporting said member during assembly of said bearing and wedge in the box, at least one of said side walls having an opening therein through which said member is inserted into said box, and a plate secured to the side of said box and covering said opening.

5. In a railway car journal box having a top wall, a journal extending into said box, a bearing disposed on said journal, a wedge disposed on said bearing and a rocker member disposed between said wedge and said top wall, means on said rocker member and said top wall for slidably interlocking said member with said top wall during assembly or disassembly of the journal box parts, said rocker member having a transversely crowned top surface, said surface being engageable with said top wall for rockable movement thereon about a substantially horizontal axis relative to said journal box.

6. A railway car journal box according to claim 5 wherein said means comprises support ledges on the underside of said top wall and flange portions on said rocker member slidably engageable with said ledges.

7. A railway car journal box according to claim 6 wherein said flange portions are convexly curved on their undersides.

8. In a railway car journal box comprising a top wall and spaced side walls having stop means thereon, a journal extending into said box and having a collar engageable with said means, a bearing disposed on said journal, a wedge disposed on said bearing, and a rocker member disposed between said wedge and said top wall and straddling said journal, bearing and wedge, the top surface of said member being curved generally convexly in a transverse direction, said member comprising depending leg portions disposed adjacent the sides of said bearing and wedge and separating the latter from said side walls, said portions extending substantially the full vertical height of said sides, said journal, bearing and wedge being rockable as a unit to cause said collar to engage said stop means when the associated car is subjected to a longitudinal impact to limit the extent of rocking of said member with respect to said box.

9. A rocker member for a railway journal box comprising a saddle portion having a pair of depending legs for straddling a journal, said saddle portion having a top surface curved generally convexly in a transverse direction for rockable engagement with the underside of the top wall in said box, said portion having front and rear flanges thereon for supporting said member in said box.

References Cited in the file of this patent

UNITED STATES PATENTS

| | | |
|---|---|---|
| 767,360 | Stephenson | Aug. 9, 1904 |
| 920,802 | Woodman | May 4, 1909 |
| 1,967,512 | Pilcher | July 24, 1934 |